United States Patent
Nakamura

[19]

[11] Patent Number: 5,816,377
[45] Date of Patent: Oct. 6, 1998

[54] BICYCLE FREEWHEEL

[75] Inventor: Yasushi Nakamura, Itami, Japan

[73] Assignee: Shimano, Inc., Osaka, Japan

[21] Appl. No.: 711,453

[22] Filed: Sep. 6, 1996

[30] Foreign Application Priority Data

Sep. 20, 1995 [JP] Japan ..................................... 7-242005

[51] Int. Cl.$^6$ ................................................. F16D 41/30
[52] U.S. Cl. ............................................... 192/64; 192/46
[58] Field of Search ................................. 192/64, 46, 45;
301/110.5, 105.1; 474/164, 160, 78

[56] References Cited

U.S. PATENT DOCUMENTS

| | | |
|---|---|---|
| 3,772,932 | 11/1973 | Nagano . |
| 3,900,088 | 8/1975 | Ozaki ........................................ 192/64 |
| 3,972,245 | 8/1976 | Allen . |
| 5,117,954 | 6/1992 | Iga ........................................... 192/45 |
| 5,125,489 | 6/1992 | Cha ........................................ 192/6 R |
| 5,642,796 | 7/1997 | Tabe ..................................... 192/45 X |

FOREIGN PATENT DOCUMENTS

| | | |
|---|---|---|
| 836753 | 1/1939 | France ..................................... 192/64 |
| 3725835 A1 | 2/1988 | Germany . |
| 2025542 | 1/1980 | United Kingdom . |
| 2193911 | 2/1988 | United Kingdom . |
| 2194007 | 2/1988 | United Kingdom .................... 192/64 |
| 2196397 | 4/1988 | United Kingdom . |

OTHER PUBLICATIONS

European search report for EP 96 30 6559, dated Dec. 12, 1996.

*Primary Examiner*—Rodney H. Bonck
*Attorney, Agent, or Firm*—James A. Deland

[57] ABSTRACT

A bicycle freewheel includes an outer cylinder part, an inner cylinder part disposed radially inwardly of the outer cylinder part so that the inner cylinder part is capable of rotation relative to the outer cylinder part, and a one-way transmission disposed between the outer cylinder part and the inner cylinder part. The one-way transmission engages the inner surface of the outer cylinder part and transmits rotation between the outer cylinder part and the inner cylinder part in only one direction. The outer cylinder part includes inner and outer surfaces. The outer surface is shaped with outer concave portions and outer convex portions for supporting a plurality of gears so that the plurality of gears do not rotate relative to the outer cylinder part. The inner surface is shaped with inner concave portions and inner convex portions, wherein the outer concave portions on the outer surface form the inner convex portions on the inner surface. A thickness of at least one of the outer cylinder part or the inner cylinder part is substantially uniform.

67 Claims, 7 Drawing Sheets

BICYCLE FREEWHEEL

BACKGROUND OF THE INVENTION

The present invention is directed to a bicycle freewheel and, more particularly, to a bicycle freewheel which is mounted to a rear hub of a bicycle.

Freewheels used to transmit a driving force to the rear bicycle wheel in one rotation direction only are usually mounted on the rear hub of a bicycle. Freewheels are used so that the bicycle can advance freely without any rotation of the pedals. Freewheels include boss type freewheels which are mounted on the boss of the rear hub by being screwed onto the rear hub, and freehub type freewheels which are fastened to the rear hub as integral parts of the rear hub. Both types of freewheels are equipped with an outer cylinder part, an inner cylinder part which is installed radially inwardly of the outer cylinder part so that the inner cylinder part is free to rotate relative to the outer cylinder part, and a one-way clutch which is installed between the outer cylinder part and inner cylinder part for transmitting the driving force from the outer cylinder part to the inner cylinder part in one rotational direction only. A plurality of gears are usually mounted on the outer cylinder part, and the inner cylinder part is usually mounted on the rear hub of the bicycle.

Conventionally, the outer cylinder part and inner cylinder part in such freewheels have been manufactured by cold-forging cylindrical elements by means of dies, and then performing mechanical working such as thread cutting, etc. In the cold-forging process, forging is repeated multiple times so that an outer cylinder part and inner cylinder part with desired shapes are obtained. Bonderizing (which is used in order to improve lubrication between the element and the die) and annealing (which is used in order to eliminate work hardening of the forged element) are performed prior to cold-forging. As a result, a large number of manufacturing processes are required. This, in turn, increases the cost and time required for manufacturing. Furthermore, since parts must be warehoused on a continuing basis, material flow costs are also increased. In addition, large-scale production equipment such as forging equipment is required, so equipment costs are also high.

SUMMARY OF THE INVENTION

The present invention is directed to a bicycle freewheel having a structure which allows the freewheel to be manufactured without expensive equipment and without requiring too many steps. As a result, the cost and time to manufacture the freewheel is substantially reduced.

In one embodiment of the present invention, a bicycle freewheel includes an outer cylinder part, an inner cylinder part disposed radially inwardly of the outer cylinder part so that the inner cylinder part is capable of rotation relative to the outer cylinder part, and a one-way transmission disposed between the outer cylinder part and the inner cylinder part. The one-way transmission engages the inner surface of the outer cylinder part and transmits rotation between the outer cylinder part and the inner cylinder part in only one direction. The outer cylinder part includes inner and outer surfaces. The outer surface is shaped with outer concave portions and outer convex portions for supporting a plurality of gears so that the plurality of gears do not rotate relative to the outer cylinder part. The inner surface is shaped with inner concave portions and inner convex portions, wherein the outer concave portions on the outer surface form the inner convex portions on the inner surface so that the outer cylinder part may be manufactured quickly with simple manufacturing processes such as by pressing (deep drawing). A thickness of at least one of the outer cylinder part or the inner cylinder part is substantially uniform to further simplify the manufacturing process.

DETAILED DESCRIPTION OF THE EMBODIMENTS

Figure 1:
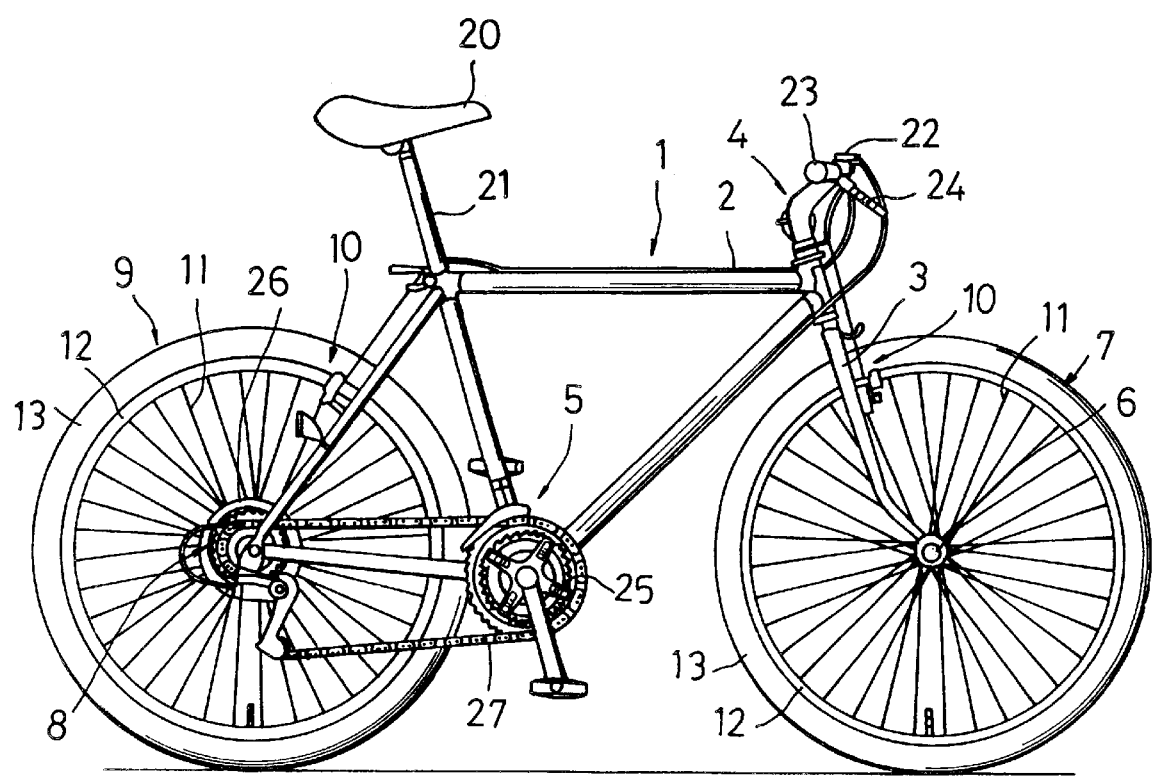
FIG. 1 is a side view of a bicycle which uses a particular embodiment of a freewheel according to the present invention.

FIG. 1 is a side view of a bicycle which uses a particular embodiment of a freewheel according to the present invention. As shown in FIG. 1, the bicycle is equipped with a diamond-shaped frame 1 which forms the skeleton of the bicycle body. Frame 1 has a frame body 2 with (e.g.) a TIG-welded aluminum pipe structure, and a front fork 3 which is rotatably supported on the front part of the frame body 2 on an inclined longitudinal axis. The bicycle has a handlebar stem 4 which is connected to the front fork 3, a driving part 5 which is attached to the lower portion of the frame body 2 for converting the pedaling force into a driving force, a front wheel 7 which has a front hub 6 that is engaged with the lower end of the front fork 3, a rear wheel 9 which as a rear hub 8 that is engaged with the rear portion of the frame body 2, and front and rear braking devices 10, 10.

A seat pillar 21 on which a saddle 20 is mounted is fastened to the frame body 2 so that the seat pillar 21 can move upward and downward. The handlebar stem 4 has a handlebar 22, grips 23 and brake levers 24 equipped with gear shift levers mounted on both ends of handlebar 22. The driving part 5 has a gear crank 25 with a three-speed large gear assembly that is rotatably supported on a hanger part of the frame body 2, a six-speed small gear assembly 26 (for example) which is mounted on the rear hub 8, and a chain 27 which is wrapped around the gear of the gear crank 25 and the small gear 26.

The front wheel 7 has a front hub 6, spokes 11 which extend outward in a substantially radial configuration from the front hub 6, a rim 12 which is screw-fastened to the tips of the aforementioned spokes 11, and a tube-equipped tire 13 which is mounted on the rim 12. Similarly, the rear wheel 9 has a rear hub 8, spokes 11 which extend outward in a substantially radial configuration from the rear hub 8, a rim 12 which is screw-fastened to the tips of the aforementioned spokes 11, and a tube-equipped tire 13 which is mounted on the rim 12.

Figure 2:
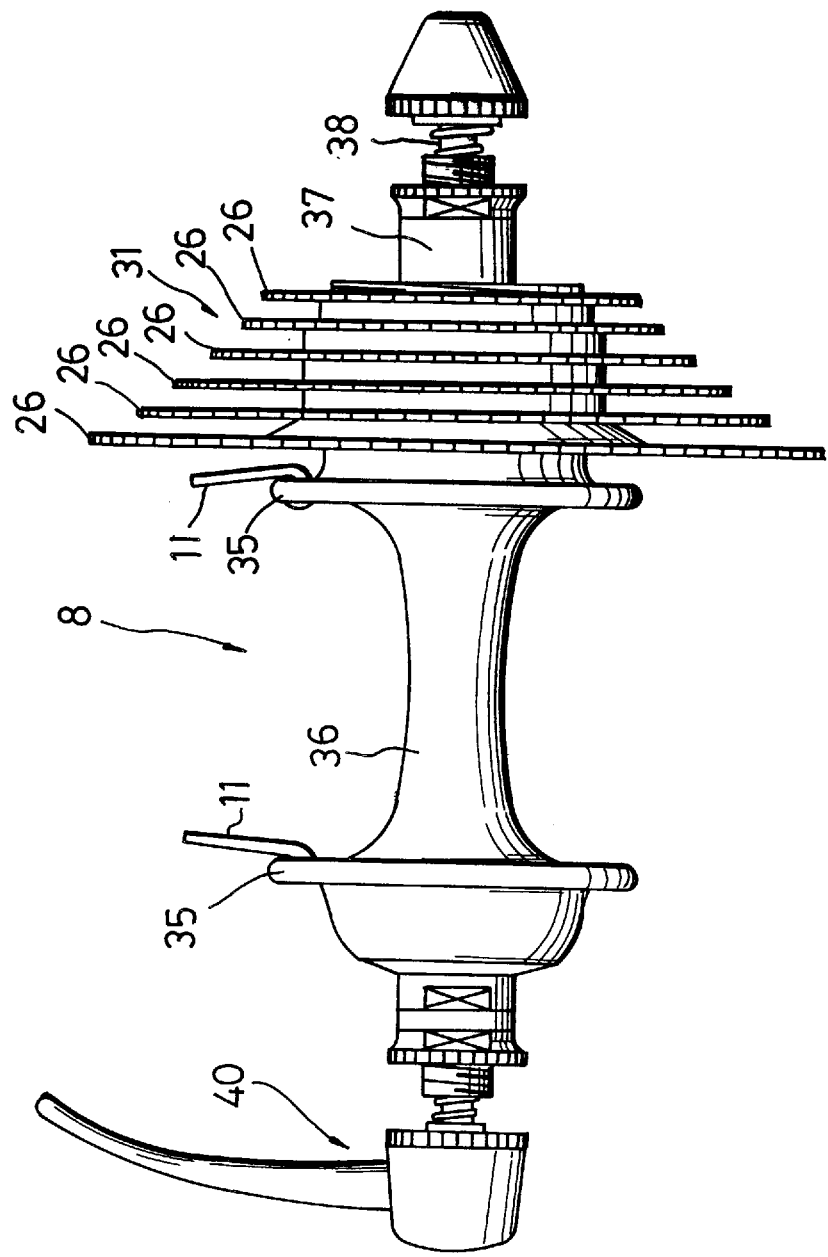
FIG. 2 is a side view of a particular embodiment of a rear hub on which is mounted a particular embodiment of a freewheel according to the present invention.
Figure 3:
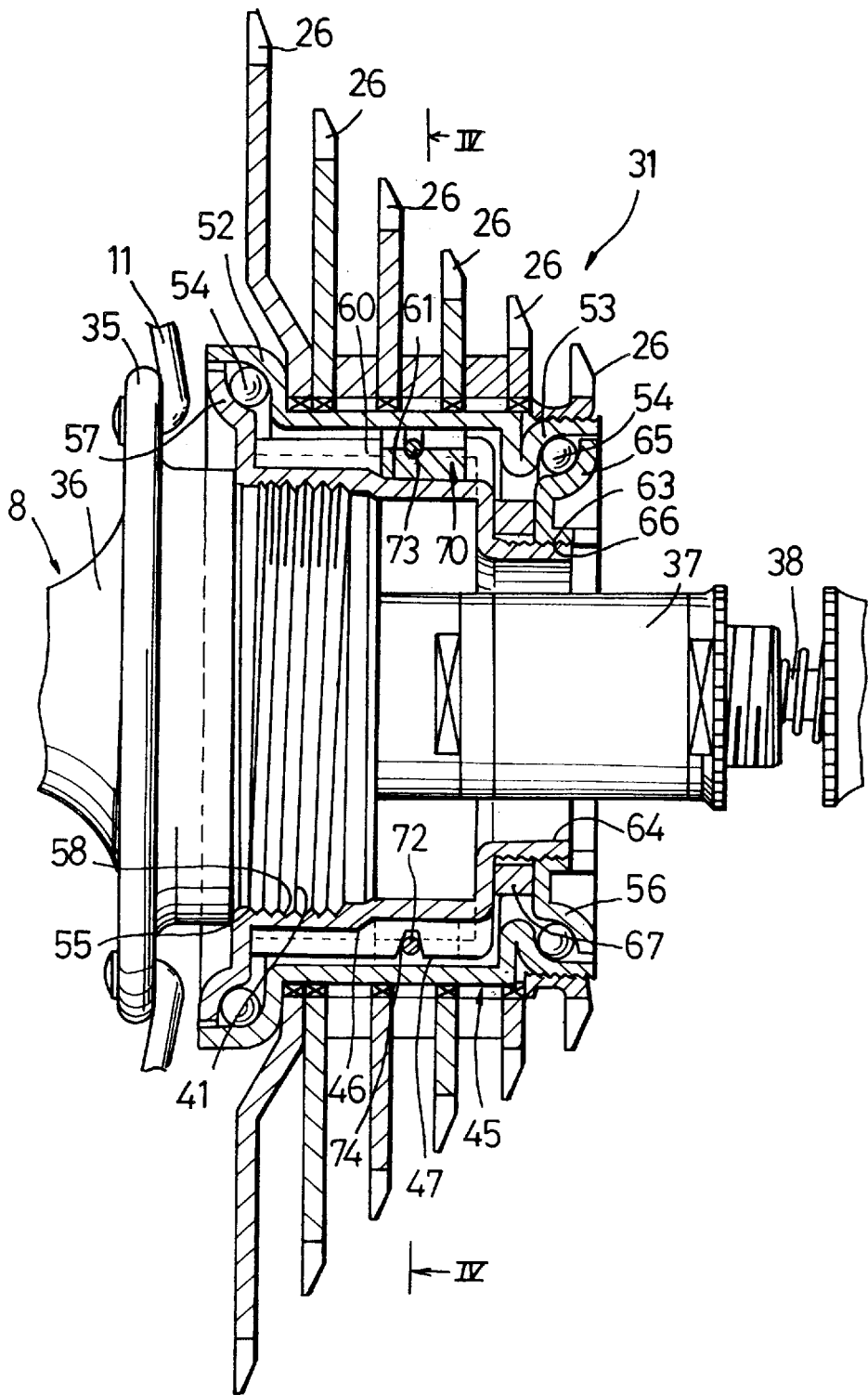
FIG. 3 is a cross sectional view of the freewheel shown in FIG. 2.

As is shown in FIG. 2, the rear hub 8 is a quick release type hub, and a freewheel 31 is mounted on the right end of the rear hub 8. The rear hub 8 has a hollow hub body 36 with a pair of flange parts 35 on the left and right, and a hub shaft 37 which rotatably supports the hub body 36. Spoke holes (not shown in the figures) are formed in the flange parts 35 at equal intervals in the circumferential direction, and the spokes 11 are inserted into these spoke holes. A quick release part 40 which includes a quick hub rod 38 is mounted on the hub shaft 37. As is shown in FIG. 3, the hub body 36 has a boss part 41 on which a male screw is formed at the right end, and freewheel 31 is screwed onto this boss part 41. Thus, the freewheel 31 is a boss type freewheel.

Freewheel 31 is equipped with an outer cylinder part 45 on the outer circumference of which six small gears 26 can be mounted so that the small gears 26 are incapable of rotation relative thereto, an inner cylinder part 46 which is installed radially inwardly of the outer cylinder part 45 so that the inner cylinder part 46 can rotate relative to the outer cylinder part 45, and a one-way clutch 47 which is installed between the outer cylinder part 45 and the inner cylinder part 46. One-way clutch 47 transmits the driving force applied to the small gears 26 from the outer cylinder part 45 to the inner cylinder part 46 in one rotational direction only.

Figure 4:
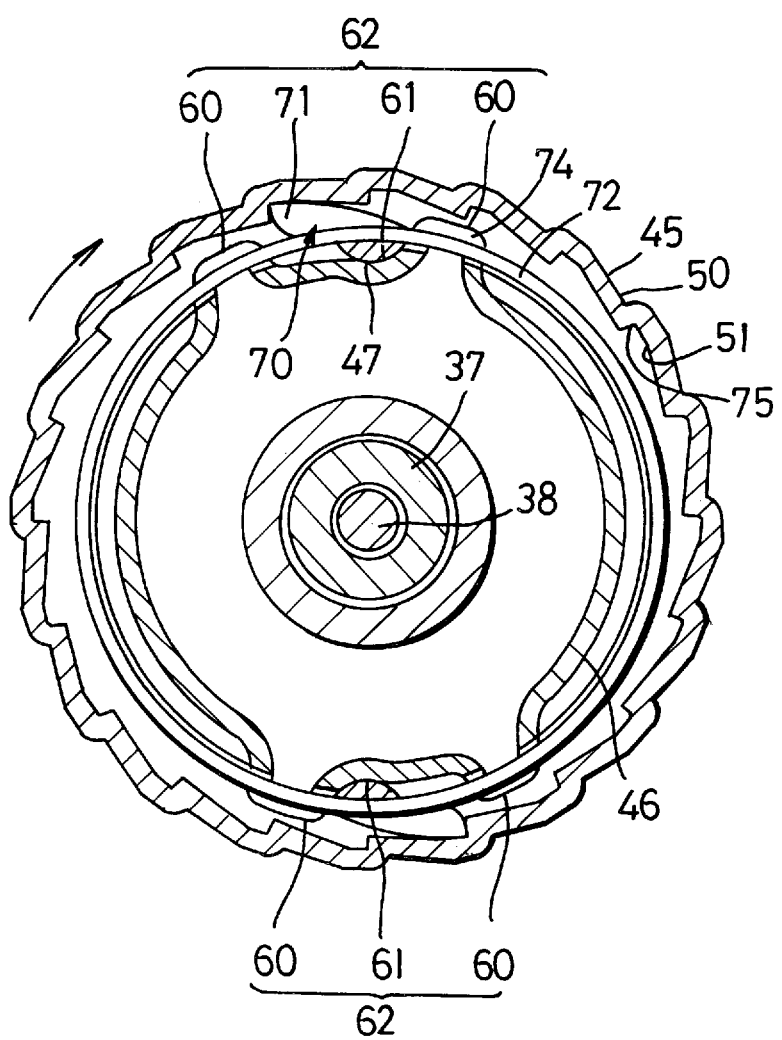
FIG. 4 is a view taken along line IV—IV in FIG. 3.

As is shown in FIG. 4, the outer cylinder part 45 is a cylindrical member which is formed with a substantially uniform thickness. This outer cylinder part 45 has a gear holding part 50 in which roughly triangular wave-form recessed portions and projecting portions are formed in the outer circumferential surface of the central portion of the outer cylinder part 45 so that the gear holding part 50 holds the small gears 26 in a manner which prevents the rotation of the small gears 26 relative to outer cylinder part 45. Outer cylinder part 45 also has a pawl engaging part 51 in which roughly triangular wave-from recessed portions and projecting portions are formed in the inner circumferential surface of the central portion of the outer cylinder part 45 so that the recessed portions and projecting portions correspond to the recessed portions and projecting portions of the gear holding part 50. Furthermore, the outer cylinder part 45 has a left ball cup 52 formed by expanding the left end portion (with respect to FIG. 3) of the outer cylinder part 45 and forming a curved surface, and a right ball cup 53 formed by bending the right end portion (with respect to FIG. 3) inward and forming another curved surface. Steel balls 54 are mounted in these ball cups 52 and 53.

The inner cylinder part 46 has an inner cylinder main body 55 and an adjustment nut 56 which is screwed onto the right end of the inner cylinder main body 55 (with respect to FIG. 3). The inner cylinder main body 55 is a cylindrical member which is formed with a substantially uniform thickness and which has a diameter that is reduced in two steps. A left cone 57 which clamps steel balls 54 against the left ball cup 52 is formed as a flange-shaped part on the left end portion of the inner cylinder main body 55. A female screw 58 which engages with the boss part 41 of the hub body 36 is formed on the inner circumference of the first reduced-diameter part to the right of the left cone 57 of the inner cylinder main body 55.

Pawl accommodating parts 62, each consisting of a pair of projections 60 and a recessed area 61 formed between the projections 60, are formed in two opposite positions on the outer circumference of the first reduced-diameter part of the inner cylinder main body 55. The second reduced-diameter part located at the right end of the inner cylinder main body 55 has a greatly reduced diameter. A male screw 63 which engages with the adjustment nut 56 is formed on the outer circumference of the second reduced-diameter part. Furthermore, a tool engaging part 64 with a concave-convex shape which is used for the attachment of a special tool that is used in order to detach the abovementioned freewheel 31 from the boss part 41 is formed on the inner circumference of the abovementioned second reduced-diameter part.

The adjustment nut 56 is a saucer-shaped ring member which has a substantially uniform thickness, and a right cone 65 which clamps the steel balls 54 against the right ball cup 53 is formed on the outer circumference of the adjustment nut 56. The inner circumferential portion of the adjustment nut 56 is bent to the right, and a female screw 66 which engages with the inner cylinder main body 55 is formed on the inner circumferential portion. Bearing parts which rotatably support the outer cylinder part 45 relative to the outer cylinder part 45 are formed by the ball cups 52, 53, steel balls 54 and cones 57, 65. A plurality of shims 67 which are used to adjust the ball contact of the bearing parts are installed between the inner cylinder main body 55 and the adjustment nut 56.

In this embodiment, the one-way clutch 47 is a ratchet type clutch. This clutch 47 has ratchet pawls 70 and a ring spring 72. Ratchet pawls 70 are installed so that they are free to swing in the pawl accommodating parts 62 between the outer cylinder part 45 and the inner cylinder part 46, and ring spring 72 drives the tips of the ratchet pawls 70 toward the outer cylinder part 45. The ratchet pawls 70 have sharp-angled pawl parts 71 formed on their tips. These pawl parts 71 engage with the angle parts 75 of the pawl engaging parts 51 formed on the inner circumference of the outer cylinder part 45. Engagement grooves 73 which are used to engage the ring spring 72 are formed in the central portions of the ratchet pawls 71 with respect to the direction of width of the ratchet pawls 71. Passage grooves 74 which allow the ring spring 72 to pass through are formed in the projections 60 of the inner cylinder party 46.

The outer cylinder part 45 has a uniform thickness, and the recessed portions and projecting portions of the gear holding part 50 and the recessed portions and projecting portions of the pawl engaging part 51 are arranged so that the projecting portions of one correspond to the recessed portions of the other. Accordingly, the outer cylinder part can be simply manufactured by pressing including deep drawing and bending. Furthermore, since the inner cylinder part 46 including the inner cylinder main body 55 and adjustment nut 56 also has a uniform thickness, the inner cylinder part 56 can also be simply manufactured by means of pressing. Moreover, such pressing can be performed using equipment which is simpler than that required for cold forging, and the time required for manufacture can be shortened.

In a bicycle constructed as described above, when the pedals are pushed in the forward direction, the resulting pedaling force is transmitted to the outer cylinder part 45 of the freewheel 31 via one of the large gears of the gear crank 25, the chain 27 and one of the small gears 26. As a result, the outer cylinder part 45 rotates in a clockwise direction as indicated by the arrow in FIG. 4. In this case, since the ratchet pawls 70 are driven by the ring spring 72 so that the pawl parts 71 are engaged with the angle parts 75 of the pawl engaging part 51 of the outer cylinder part 45, the rotation of the outer cylinder part is transmitted to the inner cylinder part 46. This driving force is then transmitted from the inner cylinder part 46 to the rear hub 8 so that the rear wheel 9 rotates. On the other hand, when the pedals are pushed in the rearward direction, the outer cylinder part 45 rotates in a counterclockwise direction. As a result, the ratchet pawls 70 are pushed against the inclined surfaces of the pawl engaging part 51 so that the ratchet pawls swing toward the center of rotation against the driving force of the ring spring 72.

Accordingly, the driving force is not transmitted, and outer cylinder part 45 is left in a state of idle rotation. Furthermore, even in cases where the inner cylinder part rotates in a clockwise direction on hilly roads, etc., the ratchet pawls 70 show a similar swinging action so that the driving force is not transmitted. As a result, the inner cylinder part 56 undergoes idle rotation.

While the above is a description of various embodiments of the present invention, further modifications may be employed without departing from the spirit and scope of the present invention. For example, the present invention could also be applied to a freehub type freewheel instead of a boss type freewheel.

Figure 5:
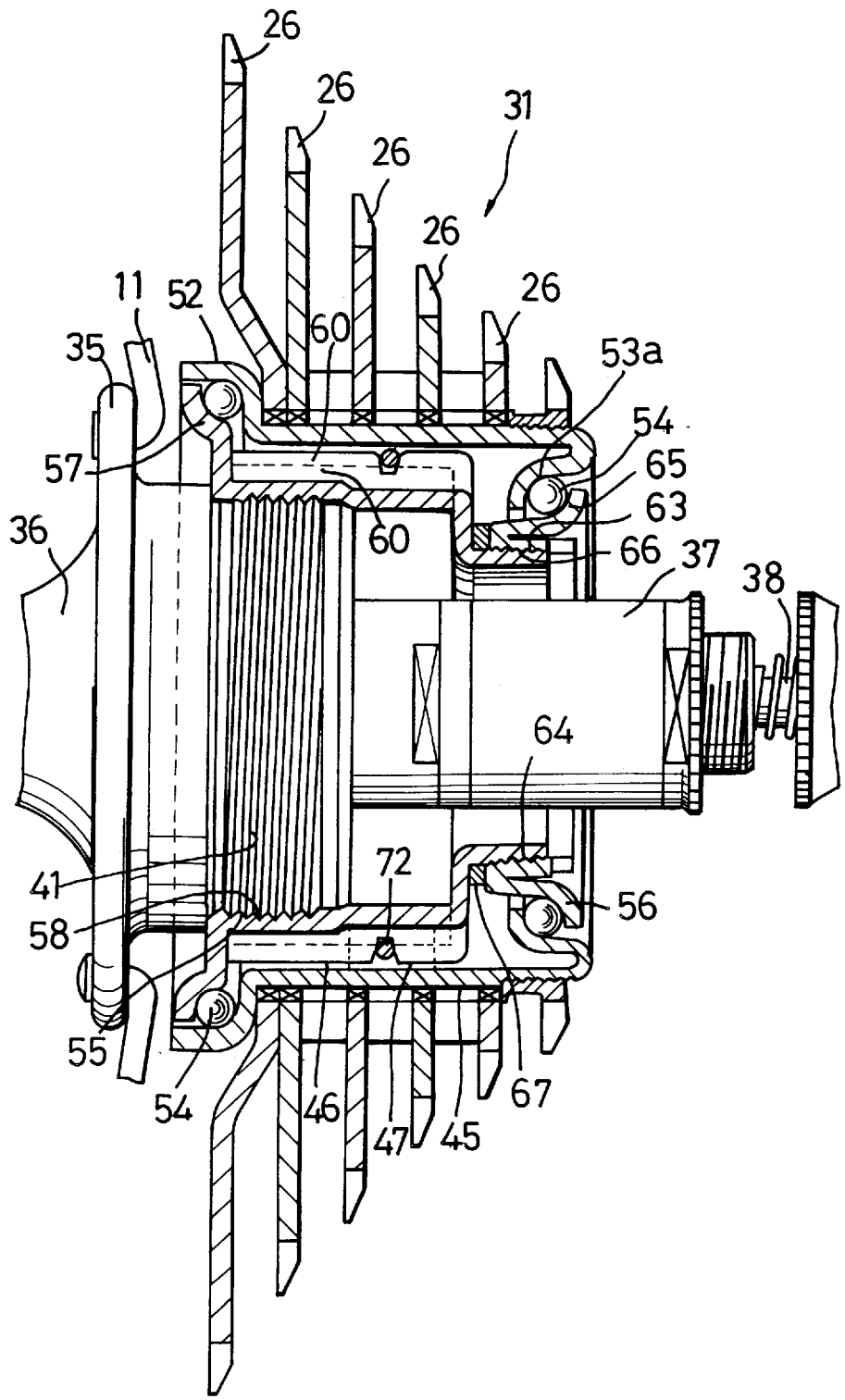
FIG. 5 is a cross sectional view of an alternative embodiment of a freewheel according to the present invention.

As shown in FIG. 5, it would also be possible to form a right ball cup 53a by bending the right end portion of the outer cylinder part 45 inward. Other structures in this case are the same as in FIG. 3 and are not described further. In this case, the rigidity of the right end portion of the outer cylinder part 45 is increased by the formation of such a bent part.

Figure 6:
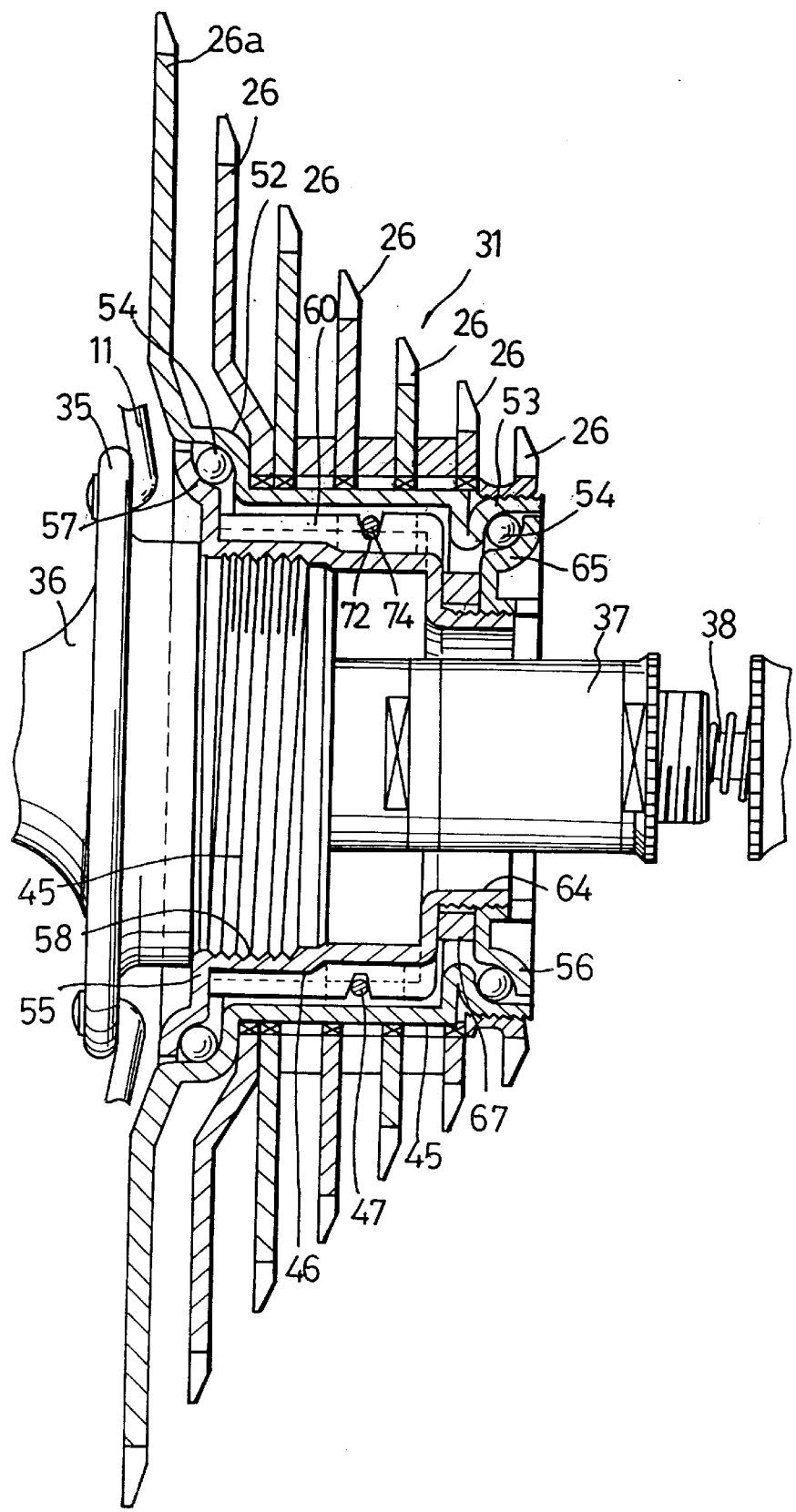
FIG. 6 is a cross sectional view of another alternative embodiment of a freewheel according to the present invention.

As shown in FIG. 6, it would also be possible to extend the outer cylinder part 45 radially outward from the left ball cup 52, and to form the low-side small gear 26a as an integral part of the outer cylinder part 45. Other structures in this case are the same as in FIG. 3 and are not described further. As a result of this construction, the small gear assembly can be made more compact. Furthermore, it would also be possible to extend the right end portion of the outer cylinder part 45 radially outward, and to form the high-side small gear as an integral part of the outer cylinder part 45.

Figure 7:
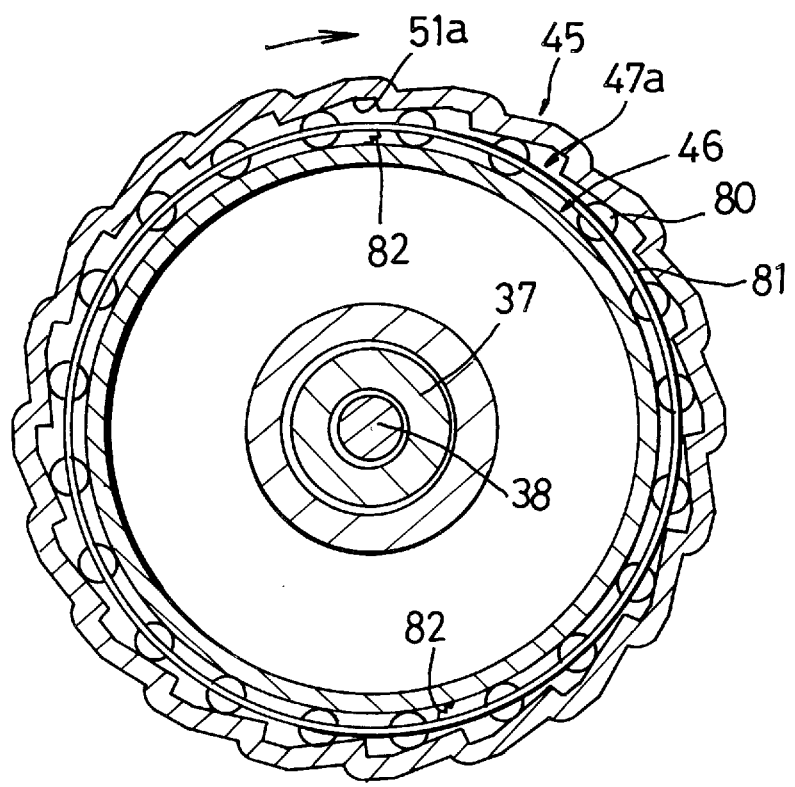
FIG. 7 is a cross sectional view of another alternative embodiment of a freewheel according to the present invention.

As shown in FIG. 7, it would also be possible to use a cam roller type one-way clutch instead of the abovementioned ratchet type one-way clutch. This one-way clutch 47a has a plurality of rollers 80 which are installed so that the roller can contact triangular waveform inclined surfaces 51 a formed on the inner circumferential surface of the outer cylinder part 45, a holder 81 which holds the rollers 80 at equal intervals in the circumferential direction, and driving springs 82 which drive the holder 81 in the clockwise direction with respect to FIG. 7. The recessed portions and projecting portions formed on the inner circumferential surface and outer circumferential surface of the outer cylinder part 45 are in a mirror-image relationship with the recessed portions and projecting portions shown in FIG. 4, so that the inclined surfaces 51a are inclined outward in the clockwise direction. The diameter of the rollers 80 is less than the maximum value of the gap between the inner cylinder part 46 and the inclined surfaces 51a, and greater than the minimum value of the gap.

In this embodiment, when the outer cylinder part 45 rotates in the clockwise direction shown by the arrow in FIG. 7, the rollers 80 engage between the outer cylinder part and the inner cylinder part so that the motive force is transmitted. On the other hand, when the outer cylinder part 45 rotates in the counterclockwise direction, the engagement of the rollers 80 is released so that the rotating side rotates in an idle state. If such a cam roller type one-way clutch is used, no clicking sound is generated during idle rotation, so the amount of noise during idle rotation can be reduced.

Thus, the scope of the invention should not be limited by the specific structures disclosed. Instead, the true scope of the invention should be determined by the following claims.

What is claimed is:

1. A bicycle freewheel comprising:
    an outer cylinder part having an axial length and a circumferential length including:
        an outer surface shaped with outer concave portions and outer convex portions for forming a plurality of gear locking members for meshing with inner peripheral surfaces of a plurality of gears for supporting the plurality of gears so that the plurality of gears do not rotate relative to the outer cylinder part;
        an inner surface shaped with inner concave portions and inner convex portions;
    an inner cylinder part having an axial length and a circumferential length disposed radially inwardly of the outer cylinder part so that the inner cylinder part is capable of rotation relative to the outer cylinder part;
    a one-way transmission disposed between the outer cylinder part and the inner cylinder part, wherein the one-way transmission engages the inner convex portions and the inner concave portions of the outer cylinder part and transmits rotation between the outer cylinder part and the inner cylinder part in only one direction; and
    wherein the thickness of the outer cylinder part is uniform along its entire axial length.

2. The freewheel according to claim 1 wherein the outer convex portions and the outer concave portions of the outer cylinder part alternate with each other continuously around the entire outer surface of the outer cylinder part.

3. The freewheel according to claim 1 wherein the inner convex portions and the inner concave portions of the outer cylinder part alternate with each other continuously around the entire inner surface of the outer cylinder part.

4. The freewheel according to claim 1 wherein the outer convex portions and the outer concave portions of the outer cylinder part alternate with each other continuously around the entire outer surface of the outer cylinder part, and wherein the inner convex portions and the inner concave portions of the outer cylinder part alternate with each other continuously around the entire inner surface of the outer cylinder part.

5. The freewheel according to claim 1 wherein the outer cylinder part includes a gear formed integrally therewith at an end thereof.

6. The freewheel according to claim 1 wherein the inner cylinder part has a threaded end surface.

7. The freewheel according to claim 1 wherein the inner cylinder part is fastened to a wheel hub member.

8. The freewheel according to claim 1:
    wherein the outer cylinder part is formed as one piece and includes:
        a first ball cup disposed on a first end thereof; and
        a second ball cup disposed on a second end thereof;
    wherein the inner cylinder part includes a ball cone on a first end thereof which faces the first ball cup;
    and further comprising:
        an adjustment nut which screws to a second end of the inner cylinder part, wherein the adjustment nut includes a second ball cone which faces the second ball cup;
        a first plurality of ball bearings disposed between the first cone and the first cup; and
    a second plurality of ball bearings disposed between the second cone and the second cup.

9. The freewheel according to claim 1 wherein the one-way transmission comprises:
    a plurality of pawls pivotably disposed on an outer surface of the inner cylinder part; and
    biasing means for biasing the plurality of pawls so that ends of the pawls contact the inner surface of the outer cylinder part.

10. The freewheel according to claim 1 wherein the one-way transmission comprises a plurality of rollers disposed between an outer surface of the inner cylinder part and the inner surface of the outer cylinder part.

11. A bicycle freewheel comprising:
an outer cylinder part having an axial length and a circumferential length including:
an outer surface shaped with outer concave portions and outer convex portions for forming a plurality of gear locking members for meshing with inner peripheral surfaces of a plurality of gears for supporting the plurality of gears so that the plurality of gears do not rotate relative to the outer cylinder part;
an inner surface shaped with inner concave portions and inner convex portions;
an inner cylinder part having an axial length and a circumferential length disposed radially inwardly of the outer cylinder part so that the inner cylinder part is capable of rotation relative to the outer cylinder part;
a one-way transmission disposed between the outer cylinder part and the inner cylinder part, wherein the one-way transmission engages the inner convex portions and the inner concave portions of the outer cylinder part and transmits rotation between the outer cylinder part and the inner cylinder part in only one direction; and
wherein the thickness of the inner cylinder, part is uniform along its entire axial length.

12. The freewheel according to claim 11 wherein the outer convex portions and the outer concave portions of the outer cylinder part alternate with each other continuously around the entire outer surface of the outer cylinder part.

13. The freewheel according to claim 11 wherein the inner convex portions and the inner concave portions of the outer cylinder part alternate with each other continuously around the entire inner surface of the outer cylinder part.

14. The freewheel according to claim 11 wherein the outer convex portions and the outer concave portions of the outer cylinder part alternate with each other continuously around the entire outer surface of the outer cylinder part, and wherein the inner convex portions and the inner concave portions of the outer cylinder part alternate with each other continuously around the entire inner surface of the outer cylinder part.

15. The freewheel according to claim 11 wherein the outer cylinder part includes a gear formed integrally therewith at an end thereof.

16. The freewheel according to claim 11 wherein the inner cylinder part has a threaded end surface.

17. The freewheel according to claim 11 wherein the inner cylinder part is fastened to a wheel hub member.

18. The freewheel according to claim 11:
wherein the outer cylinder part is formed as one piece and includes:
a first ball cup disposed on a first end thereof; and
a second ball cup disposed on a second end thereof;
wherein the inner cylinder part includes a ball cone on a first end thereof which faces the first ball cup;
and further comprising:
an adjustment nut which screws to a second end of the inner cylinder part, wherein the adjustment nut includes a second ball cone which faces the second ball cup;
a first plurality of ball bearings disposed between the first cone and the first cup; and
a second plurality of ball bearings disposed between the second cone and the second cup.

19. The freewheel according to claim 11 wherein the one-way transmission comprises:
a plurality of pawls pivotably disposed on an outer surface of the inner cylinder part; and
biasing means for biasing the plurality of pawls so that ends of the pawls contact the inner surface of the outer cylinder part.

20. The freewheel according to claim 11 wherein the one-way transmission comprises a plurality of rollers disposed between an outer surface of the inner cylinder part and the inner surface of the outer cylinder part.

21. A bicycle freewheel comprising:
an outer cylinder part having an axial length and a circumferential length including:
an outer surface shaped with outer concave portions and outer convex portions for forming a plurality of gear locking members for meshing with inner peripheral surfaces of a plurality of gears for supporting the plurality of gears so that the plurality of gears do not rotate relative to the outer cylinder part;
an inner surface shaped with inner concave portions and inner convex portions;
an inner cylinder part having an axial length and a circumferential length disposed radially inwardly of the outer cylinder part so that the inner cylinder part is capable of rotation relative to the outer cylinder part;
a one-way transmission disposed between the outer cylinder part and the inner cylinder part, wherein the one-way transmission engages the inner convex portions and the inner concave portions of the outer cylinder part and transmits rotation between the outer cylinder part and the inner cylinder part in only one direction; and
wherein the thickness of the outer cylinder part is uniform along its entire axial length, and wherein the thickness of the inner cylinder part is uniform along its entire axial length.

22. The freewheel according to claim 21 wherein the outer convex portions and the outer concave portions of the outer cylinder part alternate with each other continuously around the entire outer surface of the outer cylinder part.

23. The freewheel according to claim 21 wherein the inner convex portions and the inner concave portions of the outer cylinder part alternate with each other continuously around the entire inner surface of the outer cylinder part.

24. The freewheel according to claim 21 wherein the outer convex portions and the outer concave portions of the outer cylinder part alternate with each other continuously around the entire outer surface of the outer cylinder part, and wherein the inner convex portions and the inner concave portions of the outer cylinder part alternate with each other continuously around the entire inner surface of the outer cylinder part.

25. The freewheel according to claim 21 wherein the outer cylinder part includes a gear formed integrally therewith at an end thereof.

26. The freewheel according to claim 21 wherein the inner cylinder part has a threaded end surface.

27. The freewheel according to claim 21 wherein the inner cylinder part is fastened to a wheel hub member.

28. The freewheel according to claim 21:
wherein the outer cylinder part is formed as one piece and includes:
a first ball cup disposed on a first end thereof; and
a second ball cup disposed on a second end thereof;
wherein the inner cylinder part includes a ball cone on a first end thereof which faces the first ball cup;

and further comprising:
  an adjustment nut which screws to a second end of the inner cylinder part, wherein the adjustment nut includes a second ball cone which faces the second ball cup;
  a first plurality of ball bearings disposed between the first cone and the first cup; and
  a second plurality of ball bearings disposed between the second cone and the second cup.

29. The freewheel according to claim 21 wherein the one-way transmission comprises:
  a plurality of pawls pivotably disposed on an outer surface of the inner cylinder part; and
  biasing means for biasing the plurality of pawls so that ends of the pawls contact the inner surface of the outer cylinder part.

30. The freewheel according to claim 21 wherein the one-way transmission comprises a plurality of rollers disposed between an outer surface of the inner cylinder part and the inner surface of the outer cylinder part.

31. A bicycle freewheel comprising:
  an outer cylinder part having an axial length and a circumferential length including:
    an outer surface shaped with outer concave portions and outer convex portions for forming a plurality of gear locking members for meshing with inner peripheral surfaces of a plurality of gears for supporting the plurality of gears so that the plurality of gears do not rotate relative to the outer cylinder part;
    an inner surface shaped with inner concave portions and inner convex portions;
  an inner cylinder part having an axial length and a circumferential length disposed radially inwardly of the outer cylinder part so that the inner cylinder part is capable of rotation relative to the outer cylinder part;
  a one-way transmission disposed between the outer cylinder part and the inner cylinder part, wherein the one-way transmission engages the inner convex portions and the inner concave portions of the outer cylinder part and transmits rotation between the outer cylinder part and the inner cylinder part in only one direction; and
  wherein the outer concave portions of the outer cylinder part form the inner convex portions of the outer cylinder part.

32. The freewheel according to claim 31 wherein the thickness of the outer cylinder part is uniform along its entire axial length.

33. The freewheel according to claim 31 wherein the thickness of the inner cylinder part is uniform along its entire axial length.

34. The freewheel according to claim 31 wherein the thickness of the outer cylinder part is uniform along its entire axial length, and wherein the thickness of the inner cylinder part is uniform along its entire axial length.

35. The freewheel according to claim 31 wherein the outer convex portions and the outer concave portions of the outer cylinder part alternate with each other continuously around the entire outer surface of the outer cylinder part.

36. The freewheel according to claim 31 wherein the inner convex portions and the inner concave portions of the outer cylinder part alternate with each other continuously around the entire inner surface of the outer cylinder part.

37. The freewheel according to claim 31 wherein the outer convex portions and the outer concave portions of the outer cylinder part alternate with each other continuously around the entire outer surface of the outer cylinder part, and wherein the inner convex portions and the inner concave portions of the outer cylinder part alternate with each other continuously around the entire inner surface of the outer cylinder part.

38. The freewheel according to claim 31 wherein the outer cylinder part includes a gear formed integrally therewith at an end thereof.

39. The freewheel according to claim 31 wherein the inner cylinder part has a threaded end surface.

40. The freewheel according to claim 31 wherein the inner cylinder part is fastened to a wheel hub member.

41. The freewheel according to claim 31:
  wherein the outer cylinder part is formed as one piece and includes:
    a first ball cup disposed on a first end thereof; and
    a second ball cup disposed on a second end thereof;
  wherein the inner cylinder part includes a ball cone on a first end thereof which faces the first ball cup;
  and further comprising:
    an adjustment nut which screws to a second end of the inner cylinder part, wherein the adjustment nut includes a second ball cone which faces the second ball cup;
    a first plurality of ball bearings disposed between the first cone and the first cup; and
    a second plurality of ball bearings disposed between the second cone and the second cup.

42. The freewheel according to claim 31 wherein the one-way transmission comprises:
  a plurality of pawls pivotably disposed on an outer surface of the inner cylinder part; and
  biasing means for biasing the plurality of pawls so that ends of the pawls contact the inner surface of the outer cylinder part.

43. The freewheel according to claim 31 wherein the one-way transmission comprises a plurality of rollers disposed between an outer surface of the inner cylinder part and the inner surface of the outer cylinder part.

44. A bicycle freewheel comprising:
  an outer cylinder part having an axial length and a circumferential length including:
    an outer surface shaped with outer concave portions and outer convex portions for forming a plurality of gear locking members for meshing with inner peripheral surfaces of a plurality of gears for supporting the plurality of gears so that the plurality of gears do not rotate relative to the outer cylinder part;
    an inner surface shaped with inner concave portions and inner convex portions;
  an inner cylinder part having an axial length and a circumferential length disposed radially inwardly of the outer cylinder part so that the inner cylinder part is capable of rotation relative to the outer cylinder part;
  a one-way transmission disposed between the outer cylinder part and the inner cylinder part, wherein the one-way transmission engages the inner convex portions and the inner concave portions of the outer cylinder part and transmits rotation between the outer cylinder part and the inner cylinder part in only one direction; and
  wherein the outer convex portions of the outer cylinder part form the inner concave portions of the outer cylinder part.

45. The freewheel according to claim 44 wherein the thickness of the outer cylinder part is uniform along its entire axial length.

46. The freewheel according to claim 44 wherein the thickness of the inner cylinder part is uniform along its entire axial length.

47. The freewheel according to claim 44 wherein the thickness of the outer cylinder part is uniform along its entire axial length, and wherein the thickness of the inner cylinder part is uniform along its entire axial length.

48. The freewheel according to claim 44 wherein the outer convex portions and the outer concave portions of the outer cylinder part alternate with each other continuously around the entire outer surface of the outer cylinder part.

49. The freewheel according to claim 44 wherein the inner convex portions and the inner concave portions of the outer cylinder part alternate with each other continuously around the entire inner surface of the outer cylinder part.

50. The freewheel according to claim 44 wherein the outer convex portions and the outer concave portions of the outer cylinder part alternate with each other continuously around the entire outer surface of the outer cylinder part, and wherein the inner convex portions and the inner concave portions of the outer cylinder part alternate with each other continuously around the entire inner surface of the outer cylinder part.

51. The freewheel according to claim 44 wherein the outer cylinder part includes a gear formed integrally therewith at an end thereof.

52. The freewheel according to claim 44 wherein the inner cylinder part has a threaded end surface.

53. The freewheel according to claim 44 wherein the inner cylinder part is fastened to a wheel hub member.

54. The freewheel according to claim 44:
wherein the outer cylinder part is formed as one piece and includes:
a first ball cup disposed on a first end thereof; and
a second ball cup disposed on a second end thereof;
wherein the inner cylinder part includes a ball cone on a first end thereof which faces the first ball cup;
and further comprising:
an adjustment nut which screws to a second end of the inner cylinder part, wherein the adjustment nut includes a second ball cone which faces the second ball cup;
a first plurality of ball bearings disposed between the first cone and the first cup; and
a second plurality of ball bearings disposed between the second cone and the second cup.

55. The freewheel according to claim 44 wherein the one-way transmission comprises:
a plurality of pawls pivotably disposed on an outer surface of the inner cylinder part; and
biasing means for biasing the plurality of pawls so that ends of the pawls contact the inner surface of the outer cylinder part.

56. The freewheel according to claim 44 wherein the one-way transmission comprises a plurality of rollers disposed between an outer surface of the inner cylinder part and the inner surface of the outer cylinder part.

57. A bicycle freewheel comprising:
an outer cylinder part having an axial length and a circumferential length including:
an outer surface shaped with outer concave portions and outer convex portions for forming a plurality of gear locking members for meshing with inner peripheral surfaces of a plurality of gears for supporting the plurality of gears so that the plurality of gears do not rotate relative to the outer cylinder part;
an inner surface shaped with inner concave portions and inner convex portions;
an inner cylinder part having an axial length and a circumferential length disposed radially inwardly of the outer cylinder part so that the inner cylinder part is capable of rotation relative to the outer cylinder part;
a one-way transmission disposed between the outer cylinder part and the inner cylinder part, wherein the one-way transmission engages the inner convex portions and the inner concave portions of the outer cylinder part and transmits rotation between the outer cylinder part and the inner cylinder part in only one direction; and
wherein the outer concave portions of the outer cylinder part form the inner convex portions of the outer cylinder part, and wherein the outer convex portions of the outer cylinder part form the inner concave portions of the outer cylinder part.

58. The freewheel according to claim 57 wherein the outer cylinder part includes a gear formed integrally therewith at an end thereof.

59. The freewheel according to claim 57 wherein the inner cylinder part has a threaded end surface.

60. The freewheel according to claim 57 wherein the inner cylinder part is fastened to a wheel hub member.

61. The freewheel according to claim 57:
wherein the outer cylinder part is formed as one piece and includes:
a first ball cup disposed on a first end thereof; and
a second ball cup disposed on a second end thereof;
wherein the inner cylinder part includes a ball cone on a first end thereof which faces the first ball cup;
and further comprising:
an adjustment nut which screws to a second end of the inner cylinder part, wherein the adjustment nut includes a second ball cone which faces the second ball cup;
a first plurality of ball bearings disposed between the first cone and the first cup; and
a second plurality of ball bearings disposed between the second cone and the second cup.

62. The freewheel according to claim 57 wherein the one-way transmission comprises:
a plurality of pawls pivotably disposed on an outer surface of the inner cylinder part; and
biasing means for biasing the plurality of pawls so that ends of the pawls contact the inner surface of the outer cylinder part.

63. The freewheel according to claim 57 wherein the one-way transmission comprises a plurality of rollers disposed between an outer surface of the inner cylinder part and the inner surface of the outer cylinder part.

64. A bicycle freewheel comprising:
an outer cylinder part having an axial length and a circumferential length including:
an outer surface shaped with outer concave portions and outer convex portions for forming a plurality of gear locking members for meshing with inner peripheral surfaces of a plurality of gears for supporting the plurality of gears so that the plurality of gears do not rotate relative to the outer cylinder part;
an inner surface shaped with inner concave portions and inner convex portions;
wherein the outer convex portions and the outer concave portions of the outer cylinder part alternate with each other continuously around the entire outer surface of the outer cylinder part;

wherein the inner convex portions and the inner concave portions of the outer cylinder part alternate with each other continuously around the entire inner surface of the outer cylinder part;

wherein the outer concave portions of the outer cylinder part form the inner convex portions of the outer cylinder part; and wherein the outer convex portions of the outer cylinder part form the inner concave portions of the outer cylinder part;

an inner cylinder part having an axial length and a circumferential length disposed radially inwardly of the outer cylinder part so that the inner cylinder part is capable of rotation relative to the outer cylinder part;

a one-way transmission disposed between the outer cylinder part and the inner cylinder part, wherein the one-way transmission engages the inner surface of the outer cylinder part and transmits rotation between the outer cylinder part and the inner cylinder part in only one direction; and wherein a thickness of at least one of the outer cylinder part or the inner cylinder part is substantially uniform.

65. The freewheel according to claim 64 wherein the thickness of the outer cylinder part is uniform along its entire axial length.

66. The freewheel according to claim 65 wherein the thickness of the inner cylinder part is uniform along its entire axial length.

67. A bicycle freewheel comprising:

a plurality of gears, each gear having an inner peripheral surface with a plurality of concave attachment surfaces and a plurality of convex attachment surfaces;

an outer cylinder part having an axial length and a circumferential length including:
  an outer surface shaped with outer concave portions and outer convex portions respectively meshing with the plurality of convex attachment surfaces and the plurality of concave attachment surfaces of the plurality of gears so that the plurality of gears do not rotate relative to the outer cylinder part;
  an inner surface shaped with inner concave portions and inner convex portions, wherein each inner concave portion circumferentially aligns with a corresponding outer convex portion and each inner convex portion circumferentially aligns with a corresponding outer concave portion;

an inner cylinder part having an axial length and a circumferential length disposed radially inwardly of the outer cylinder part so that the inner cylinder part is capable of rotation relative to the outer cylinder part;

a one-way transmission disposed between the outer cylinder part and the inner cylinder part, wherein the one-way transmission engages the inner convex portions and the inner concave portions of the outer cylinder part and transmits rotation between the outer cylinder part and the inner cylinder part in only one direction;

wherein a thickness of at least one of the outer cylinder part or the inner cylinder part is substantially uniform; and wherein the outer convex portions and the outer concave portions of the outer cylinder part alternate with each other continuously around the entire outer surface of the outer cylinder part, wherein the inner convex portions and the inner concave portions of the outer cylinder part alternate with each other continuously around the entire inner surface of the outer cylinder part, wherein the outer concave portions of the outer cylinder part form the inner convex portions of the outer cylinder part, and wherein the outer convex portions of the outer cylinder part form the inner concave portions of the outer cylinder part.

* * * * *